C. HOWARD & H. LAWSON.
WHEEL.
APPLICATION FILED APR. 3, 1917.
1,253,975.
Patented Jan. 15, 1918.
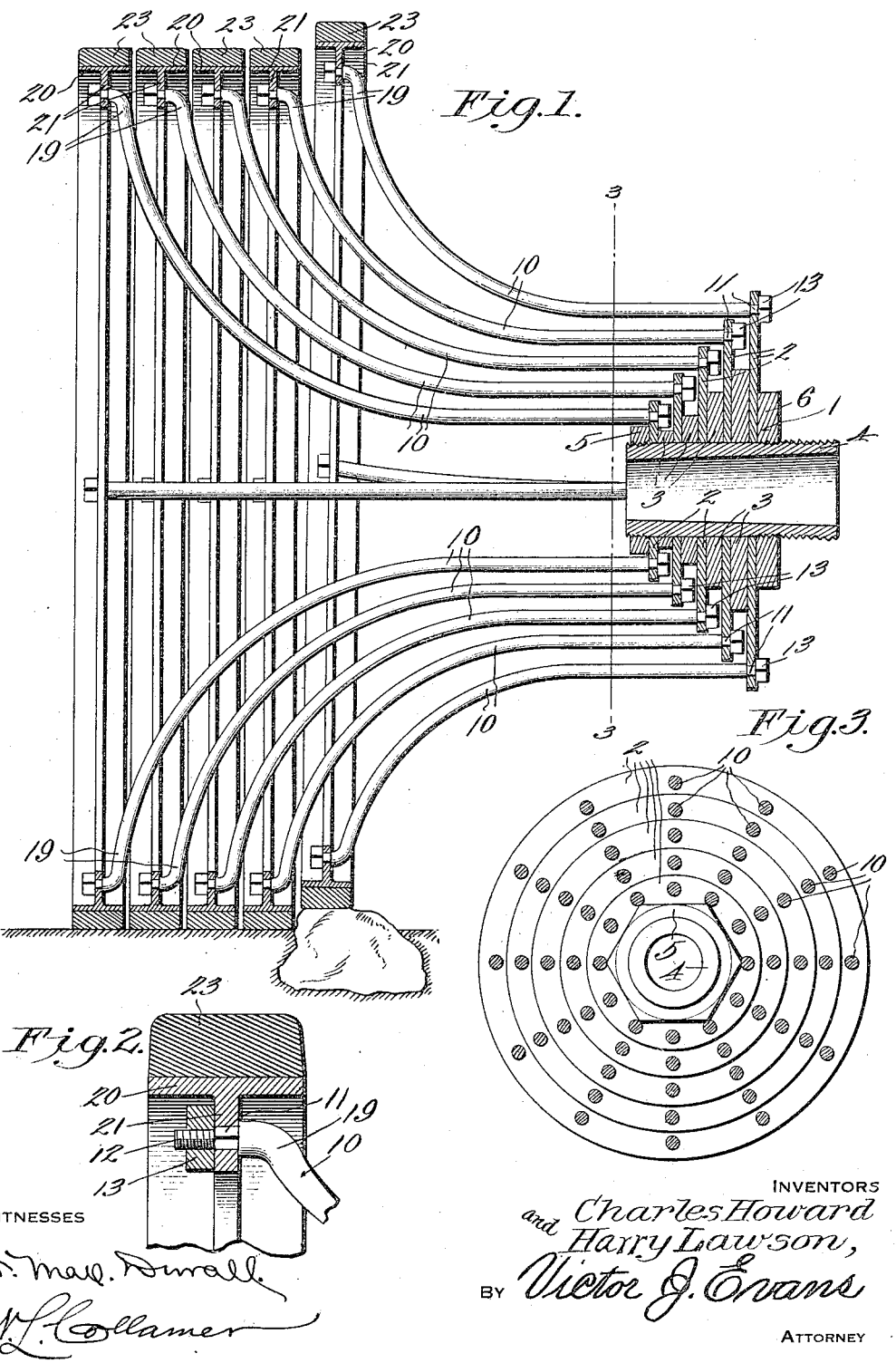

UNITED STATES PATENT OFFICE.

CHARLES HOWARD AND HARRY LAWSON, OF HOLTVILLE, CALIFORNIA, ASSIGNORS OF ONE-THIRD TO ANDY M. IMHOFF, OF HOLTVILLE, CALIFORNIA.

WHEEL.

1,253,975.

Specification of Letters Patent. Patented Jan. 15, 1918.

Application filed April 3, 1917. Serial No. 159,494.

*To all whom it may concern:*

Be it known that we, CHARLES HOWARD and HARRY LAWSON, citizens of the United States, residing at Holtville, in the county of Imperial and State of California, have invented new and useful Improvements in Wheels, of which the following is a specification.

This invention relates to spring wheels, and more especially to those employing curved spring spokes; and the object of the same is to make a resilient wheel in a plurality of independent rims lying side by side and normally held in strict alinement by means of spring spokes leading individually from them to the hub.

This object is carried out in the manner hereinafter more fully described and claimed, and as shown in the drawings wherein:—

Figure 1 is a transverse sectional view through the axis of a wheel constructed in accordance with our invention, one rim being deflected slightly upward as it passes over a stone or other obstruction on the roadway. In this view the parts of the far side of the section line are purposely omitted for the sake of clearness.

Fig. 2 is an enlarged detail of the construction at the outer end of each spoke where it is connected with the rim flange, this view also showing how the rim may carry a rubber tire.

Fig. 3 is a section on the line 3—3 of Fig. 1.

In the drawings we have shown a wheel made up of five sections, although we do not wish to be limited in this respect as there might be a greater or less number of sections in the complete wheel. Broadly speaking, our idea is to utilize a plurality of practically duplicate narrow rims standing side by side and as close together as may be successfully employed while permitting them to have independent movements, and for this purpose the rims are carried independently by spring spokes leading from them to the hub. Thus it will be seen that, should the wheel pass over a small obstruction in the roadway such as a stone of a size to strike but a single rim or perhaps two, that one or those two will rise and the remaining rims will travel along side the stone on the surface of the roadway and the occupant of the vehicle will hardly feel any jolt. This rising of one rim while the others do not rise, is permitted by the fact that each rim is supported by resilient steel springs which are employed for spokes, and only those springs yield which carry the rim which passes over the obstruction. The preferred means for attaching the spokes to the rim flange and to the hub are described in detail below and shown in the drawings. Herein we show the spokes as extending on lines practically radial to the axis of the wheel, but it will be clear that they might be differently disposed without departing from the spirit of our invention. The present application is not concerned with the specific details of the spokes as far as the traction of the wheel demands, but only with their disposition which gives the rim of the wheel resiliency. Finally, although, we have shown tires on the several metal rims, they might of course be omitted and the metal tires travel on the roadway. The manner of securing the tire or tires is not illustrated herewith.

Coming now to details, the numeral 1 designates the hub, herein shown as made up of a number of plates or disks 2 with interposed washers 3, all mounted on a sleeve 4 between nuts 5 and 6. Said sleeve is suitably mounted on the axle spindle as usual, and the several plates are in the form of disks of various diameters as illustrated. The springs 10 are preferably of steel rods, squared at their inner ends as at 11, passing through holes in the plates or disks near their edges, their inner extremities being reduced and threaded as at 12 so as to receive nuts 13. The body of each spring extends thence axially to a considerable distance beyond the hub, and curves radially from the line of the axle spindle projected, and the outer extremity 19 of the spring is bent axially outward and may be squared and threaded for the reception of another nut.

Each wheel-section is made up of a rim 20, a flange 21 standing at right angles thereto and possibly cast integral therewith, and a tire 23 if the same is to be employed. The threaded outer ends of the spokes are passed through the flange and engage therewith by tightening up the nuts as will be clear. We do not wish to be limited to the exact means of fastening the spokes at either end, but have shown one successful way in which it may be done. The spokes from the inner plate or disk i. e. that next the vehicle lead to the inner section, those from the next plate to the section next the inner section, and so on throughout the series; and therefore it may be said that the inner plate carries the inner wheel section, the next the next section, et cetera; and no section is connected with any other section excepting through the instrumentality of the several spokes and the hub.

A wheel so constructed may be of any size and may be used as the front wheel of an automobile or the driver, or it could be used on a truck or other vehicle. Unless it be the driver, it is loosely mounted on the axle spindle by means not necessary to amplify herein. The rims of the several sections will stand close to each other, edge to edge, but are preferably spaced a little so that one section may rise as it passes over an obstruction without coming in contact with the next adjacent section.

What is claimed as new is:—

1. The herein described wheel made up of a plurality of rims standing edge to edge and slightly out of contact with each other, a hub made up of a plurality of plates, and a series of sets of curved spring spokes, those of each set connecting one rim with one plate independently of the others, for the purpose set forth.

2. The herein described wheel made up of a plurality of rims standing edge to edge and slightly out of contact with each other, a tire surrounding each rim, a hub composed of a plurality of disks of different size, and a series of sets of spring spokes, those of each set being connected at their inner ends to one disk and at their outer ends to one rim independently of all others, for the purpose set forth.

3. In a wheel, the combination with a plurality of rims standing edge to edge, and flanges carried by the several rims and pierced with holes; of a hub made up of a series of disks of different size, washers interposed between them, a sleeve on which the disks and washers are mounted, the disks each having a series of holes, and a series of sets of spring spokes, those of each set having their inner ends passed through the holes in one disk and their outer ends passed through the holes in one flange, and means for securing said ends therein.

In testimony whereof we affix our signatures.

CHARLES HOWARD.
HARRY LAWSON.

Copies of this patent may be obtained for five cents each, by addressing the "Commissioner of Patents, Washington, D. C."